(12) United States Patent
Di Zazzo et al.

(10) Patent No.: US 9,656,642 B2
(45) Date of Patent: May 23, 2017

(54) ELECTRIC BRAKING SYSTEM AND METHOD RELYING ON VOLTAGE HYSTERESIS FOR APPLIED BRAKE POWER CONTROL

(71) Applicant: Bombardier Inc., Dorval (CA)

(72) Inventors: Marco Di Zazzo, St-Leonard (CA); Bertrand Plante, St-Jérôme (CA)

(73) Assignee: BOMBARDIER INC., Dorval (CA)

( * ) Notice: Subject to any disclaimer, the term of this patent is extended or adjusted under 35 U.S.C. 154(b) by 0 days.

(21) Appl. No.: 14/771,582

(22) PCT Filed: Feb. 27, 2014

(86) PCT No.: PCT/IB2014/000218
§ 371 (c)(1),
(2) Date: Aug. 31, 2015

(87) PCT Pub. No.: WO2014/135947
PCT Pub. Date: Sep. 12, 2014

(65) Prior Publication Data
US 2016/0016563 A1    Jan. 21, 2016

Related U.S. Application Data

(60) Provisional application No. 61/773,508, filed on Mar. 6, 2013.

(51) Int. Cl.
*B60T 8/172* (2006.01)
*H02P 15/00* (2006.01)
(Continued)

(52) U.S. Cl.
CPC .............. *B60T 8/172* (2013.01); *B60T 13/74* (2013.01); *B60T 17/22* (2013.01); *B64C 25/42* (2013.01); *H02P 15/00* (2013.01)

(58) Field of Classification Search
CPC .......... B60T 8/172; B60T 13/74; B60T 17/22; B64C 25/42; H02P 15/00; H02J 4/00
See application file for complete search history.

(56) References Cited

U.S. PATENT DOCUMENTS 4,610,023 A * 9/1986 Noso ....................... G10L 15/20
704/233
6,227,626 B1 * 5/2001 Blattert ................ B60K 31/042
303/122.08

(Continued)

FOREIGN PATENT DOCUMENTS

CN          101516695 A       8/2009

OTHER PUBLICATIONS

PCT International Search Report and Written Opinion dated Jun. 23, 2014 re: International Patent Application No. PCT/IB2014/000218.
(Continued)

*Primary Examiner* — Rodney Butler
*Assistant Examiner* — Frederick Brushaber
(74) *Attorney, Agent, or Firm* — Norton Rose Fulbright Canada LLP

(57) ABSTRACT

A method of operating electric brakes for a vehicle including monitoring at least a voltage in a power system of the vehicle, and adjusting a power provided to the electric brakes based on at least the monitored voltage to control a current according to a predetermined behavior.

20 Claims, 4 Drawing Sheets

(51) Int. Cl.
  *B64C 25/42*  (2006.01)
  *B60T 13/74*  (2006.01)
  *B60T 17/22*  (2006.01)

(56) References Cited

U.S. PATENT DOCUMENTS

| | | | |
|---|---|---|---|
| 6,854,813 B2* | 2/2005 | Yokoyama | B60T 8/3255 |
| | | | 303/122.04 |
| 8,204,661 B2 | 6/2012 | Godo | |
| 2004/0065489 A1* | 4/2004 | Aberle | B60L 11/1887 |
| | | | 180/65.1 |
| 2004/0084963 A1* | 5/2004 | Costello | B60T 13/74 |
| | | | 307/9.1 |
| 2005/0035656 A1* | 2/2005 | Kuramochi | H02J 1/108 |
| | | | 307/10.1 |
| 2005/0201030 A1* | 9/2005 | Toth | H02H 9/042 |
| | | | 361/91.1 |
| 2006/0214506 A1* | 9/2006 | Albright | B60T 7/20 |
| | | | 303/123 |
| 2008/0073970 A1 | 3/2008 | Griffith | |
| 2011/0101778 A1* | 5/2011 | Yang | H02J 7/0068 |
| | | | 307/52 |

OTHER PUBLICATIONS

The State Intellectual Property Office of the People's Republic of China; Notification of First Office Action dated Oct. 8, 2016 re: Application No. 201480011792.0.

English translation of Chinese patent document No. CN 101516695A dated Aug. 26, 2009; www.google.ca/patents . . . .

* cited by examiner

ELECTRIC BRAKING SYSTEM AND METHOD RELYING ON VOLTAGE HYSTERESIS FOR APPLIED BRAKE POWER CONTROL

CROSS-REFERENCE TO RELATED APPLICATION(S)

This application is a national phase application under 35 U.S.C. 371 of International Patent Application No. PCT/IB2014/000218 filed on Feb. 27, 2014, which claims priority from U.S. Provisional Patent Application Ser. No. 61/773,508 filed on Mar. 6, 2013, the entire contents of which are hereby incorporated by reference.

FIELD OF THE INVENTION

The present invention concerns the construction and operation of a brake system for a vehicle and method of operating a brake system for a vehicle, in particular for an aircraft. More specifically, the present invention involves the construction of and a control scheme for an electric braking system that relies on voltage hysteresis for applied control of the brakes.

DESCRIPTION OF THE RELATED ART

Traditionally, aircraft have relied on hydraulic systems to power the brakes on the aircraft.

Electric braking systems recently have become a consideration for aircraft designers. Electric braking systems offer the same braking power as hydraulic systems. Electric braking systems rely on servo motors to apply pressure to the brake pads on the aircraft's brakes.

In addition, there is greater dispatchability with multiple redundant motors and brake controllers.

As should be apparent to those skilled in the art, the main power on board an aircraft is provided by a DC power system nominally at 28 volts (28 VDC). This is considered an industry standard for aircraft. It is noted that some aircraft have higher operating voltages. Others have lower operating voltages, i.e., 24 VDC or 12 VDC.

With respect to electric braking systems, a challenge arises if the voltage in the power system on board the aircraft changes.

Basic physics teaches that the instantaneous power (P) available in an electrical system is directly proportional to both the current (I) and the voltage (V) accessible in the system at a particular moment in time. The following equation defines that relationship:

$$P = I \cdot V = I^2 \cdot R = V^2/R \tag{1}$$

As should be apparent from the foregoing equation, as the voltage decreases, the current must be increased so that the electrical system provides the same magnitude of power.

With this in mind, aircraft designers that choose to incorporate electric brakes on an aircraft find it prudent to accommodate voltage variability on board an aircraft.

SUMMARY OF THE INVENTION

The present invention addresses the challenge associated with accommodating voltage variability on board an aircraft.

As a result, the present invention provides a method of operating electric brakes for a vehicle that includes monitoring at least a voltage in a power system of the vehicle, and adjusting a power provided to the electric brakes based on at least the monitored voltage to control a current according to a predetermined behavior.

The present invention contemplates that the vehicle is an aircraft.

It is also contemplated that the method operates according to an increase in the voltage over time and a decrease of the voltage over time, limiting the power to no less than 80% of maximum.

When the voltage is decreasing, the present invention contemplates that a first current may be selected as a function of a first voltage according to a first behavioral zone. The first current and the first voltage may exhibit a substantially linear first relationship with a negative slope. A second current may be selected as a function of a second voltage according to a second behavioral zone. The second current and the second voltage may exhibit a substantially linear second relationship with a negative slope and wherein the first current is greater than the second current. The third current may be selected as a function of a third voltage according to a third behavioral zone. The third current and the third voltage may exhibit a third linear relationship therebetween.

It is also contemplated that the third linear relationship may exhibit at least one of a substantially positive slope, a substantially infinite slope, and a substantially negative slope.

For the present invention, when the voltage is increasing, the first voltage may be between about 22 to 28 V (or a maximum). The first current may be between about 17 to 21 A. The first current may be between about 17 to 23 A. The first current may be between a minimum to 23 A. The second voltage may be between about 17 to 22 V. The second current may be between about 12 to 17 A. The second current may be between about 13 to 17 A. The third voltage may be about 22 V.

For the present invention, when the voltage is increasing, a first current may be selected as a function of a first voltage according to a first behavioral zone. The first current and the first voltage may exhibit a substantially linear first relationship with a negative slope. A second current may be selected as a function of a second voltage according to a second behavioral zone. The second current and the second voltage may exhibit a substantially linear second relationship with a negative slope and wherein the first current is greater than the second current. The third current may be selected as a function of a third voltage according to a third behavioral zone. The third current and the third voltage may exhibit a third linear relationship therebetween.

The third linear relationship may exhibit at least one of a substantially positive slope, a substantially infinite slope, and a substantially negative slope.

When the voltage is decreasing, the first voltage may be between about 24 to 28 V (or a maximum). The first current may be between about 17 to 21 A. The second voltage may be between about 17 to 24 V. The second voltage may be between about 17 to 23 V. The second current may be between about 12 to 17 A. The third voltage may be about 24V. The third current may be between about 13 and 23 A. The third current may be between about 12 and 21 A.

The present invention also contemplates the provision of a controller for operating electric brakes for a vehicle according to an executable set of instructions. The controller receives at least a voltage in a power system of the vehicle, and adjusts a power provided to the electric brakes based on at least the monitored voltage to control a current according to a predetermined behavior.

The vehicle may be an aircraft.

The controller may respond to an increase in the voltage over time and a decrease of the voltage over time, limiting the power to no less than 80% of maximum. When the voltage is decreasing; a first current may be selected as a function of a first voltage according to a first behavioral zone, wherein the first current and the first voltage exhibit a substantially linear first relationship with a negative slope; a second current may be selected as a function of a second voltage according to a second behavioral zone, wherein the second current and the second voltage exhibit a substantially linear second relationship with a negative slope and wherein the first current is greater than the second current; and a third current may be selected as a function of a third voltage according to a third behavioral zone, wherein the third current and the third voltage exhibit a third linear relationship therebetween.

The third linear relationship may exhibit at least one of a substantially positive slope, a substantially infinite slope, and a substantially negative slope.

The first voltage may be between about 22 to 28 V. The first current may be between about 17 to 23 A. The second voltage may be between about 17 to 22 V. The second current may be between about 12 to 17 A. The third voltage may be about 22 V.

When the voltage is increasing; a first current may be selected as a function of a first voltage according to a first behavioral zone, wherein the first current and the first voltage exhibit a substantially linear first relationship with a negative slope; a second current may be selected as a function of a second voltage according to a second behavioral zone, wherein the second current and the second voltage exhibit a substantially linear second relationship with a negative slope and wherein the first current is greater than the second current; and a third current may be selected as a function of a third voltage according to a third behavioral zone, wherein the third current and the third voltage exhibit a third linear relationship therebetween.

The third linear relationship may exhibit at least one of a substantially positive slope, a substantially infinite slope, and a substantially negative slope. The first voltage may be between about 24 to 28 V. The first current may be between about 17 to 21 A. The second voltage may be between about 17 to 24 V. The second current may be between about 12 to 17 A. The third voltage may be about 24 V. The third current may between about 13 and 23 A In addition, the present invention provides for an executable set of instructions, executable on a controller for operating electric brakes for a vehicle. The executable set of instructions execute a method that includes receiving at least a voltage in a power system of the vehicle and adjusting a power provided to the electric brakes based on at least the monitored voltage to control a current according to a predetermined behavior.

Further aspects of the present invention will be made apparent form the paragraphs that follow.

BRIEF DESCRIPTION OF THE DRAWING(S)

The present invention will now be described in connection with the drawing appended hereto, in which.

DETAILED DESCRIPTION OF EMBODIMENT(S) OF THE INVENTION

The present invention will now be described in connection with one or more embodiments thereof. The discussion of any particular embodiment is not intended to be limiting of the present invention. To the contrary, the discussion of selected embodiments is intended to exemplify the breadth and scope of the present invention. As should be apparent to those skilled in the art, variations and equivalents of the embodiment(s) described herein may be employed without departing from the scope of the present invention. Those variations and equivalents are intended to be encompassed by the scope of the present patent application.

The present invention will now be discussed in the content of the construction of an aircraft 10, such as the one illustrated in the perspective view provided in FIG. 1.

Figure 1:
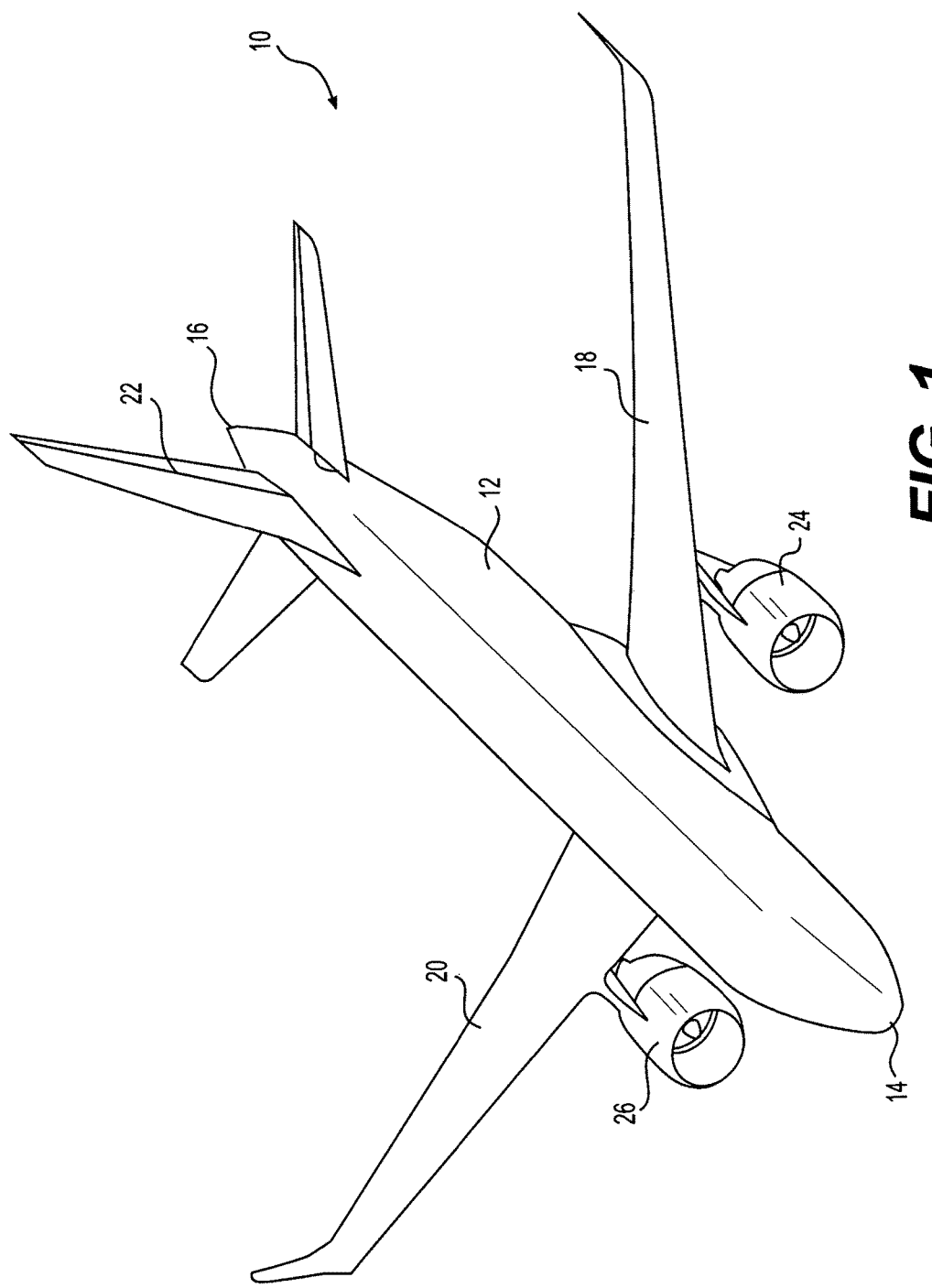
FIG. 1 is a perspective illustration of an aircraft of the type on which the electrical braking system of the present invention may be employed.

FIG. 1 is a perspective illustration of an aircraft 10 to which the present invention applies. The aircraft 10 includes a fuselage 12 defining a forward end 14 and a rear (or aft) end 16. Two wings 18, 20 extend laterally from the fuselage 12. A tail section 22 is attached to the rear end 16 of the aircraft. As should be apparent to those skilled in the art, the wings 18, 20 and the tail section 22 incorporate multiple control surfaces that are responsible for flying characteristics and flight operations of the aircraft 10. Two engines 24, 26 are suspended from and connect to the wings 18, 20, as illustrated. As should be apparent to those skilled in the art, the two engines 24, 26 could alternatively be located at the rear end 16 of the aircraft without departing from the scope of the present invention.

The brakes on an aircraft 10 typically are disk brakes, similar to disk brakes that may are found on automobiles. In disk brakes, brake pads are positioned on either side of a rotor. The caliper (or calipers) applies (apply) pressure to the brake pads to squeeze the brake pads against the rotor. The greater the pressure applied, the higher the braking force exerted on the rotor.

With respect to the aircraft 10 of the present invention, electrical motors connect to the brake disks to apply pressure thereto. The pressure applied by the motors correspond to the power generated by the motors. As discussed in connection with equation (1), above, the power generated by the servo motors is directly proportional to the current and the voltage available to the servo motors.

On an aircraft 10, it is conventional to provide a 28 V power supply. While it is not expected that the voltage will deviate too greatly from the 28 V standard during normal operation, when aircraft designers design an aircraft 10, they consider the impact of variations in the system voltage on various system on the aircraft 10. This includes the impact of voltage variation on the electric braking system on board the aircraft 10.

As should be apparent to those skilled in the art, and as should be apparent from an understanding of equation (1), as the voltage in the system decreases, an increased current is needed for the system to provide constant power. As current increases, however, there exists an increased risk that the current might exceed the threshold for a circuit breaker. If a circuit breaker on the braking system of the aircraft 10 were to trip (or open), power to the braking system through that circuit breaker would become disabled, requiring the aircraft to rely on one or more redundant systems. It is preferred to design a system to minimize or eliminate the possibility of the occurrence of such a set of circumstances.

One possible solution that might be employed is to incorporate circuit breakers with a higher current threshold. However circuit breakers with higher set points are more costly and add weight to the aircraft 10. As a result, larger circuit breakers are not necessarily a suitable solution.

The present invention provides an electric braking system 28 for an aircraft 10 that relies on smaller capacity circuit breakers while providing more than a minimum amount of braking power to stop the aircraft 10.

Figure 2:
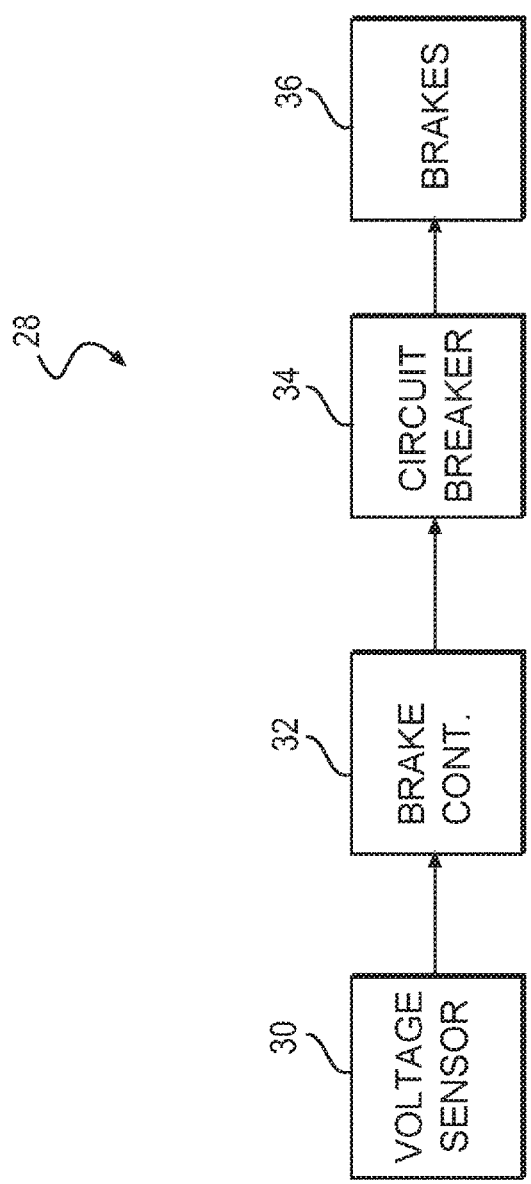
FIG. 2 is a graphical representation of one contemplated embodiment of the braking system according to the present invention.

FIG. 2 illustrates one contemplated embodiment of the braking system 28 of the present invention.

The braking system 28 includes a voltage sensor 30 that measures the voltage in the power system on board the aircraft 10. The voltage sensor 30 provides input to a brake controller 32 to monitor the voltage in the power system on board the aircraft 10. As discussed in greater detail below, the brake controller 32 controls the current I provided to brakes 36 based on the voltage V. In an embodiment, the current I is provided to electrical motors of the brakes 36.

As should be apparent to those skilled in the art, the circuit breaker 34 is designed to open (or trip) if the current I exceeds a predetermined threshold amount. The circuit breaker 34, therefore, provides electrical protection to selected components from excessive current I.

Figure 3:
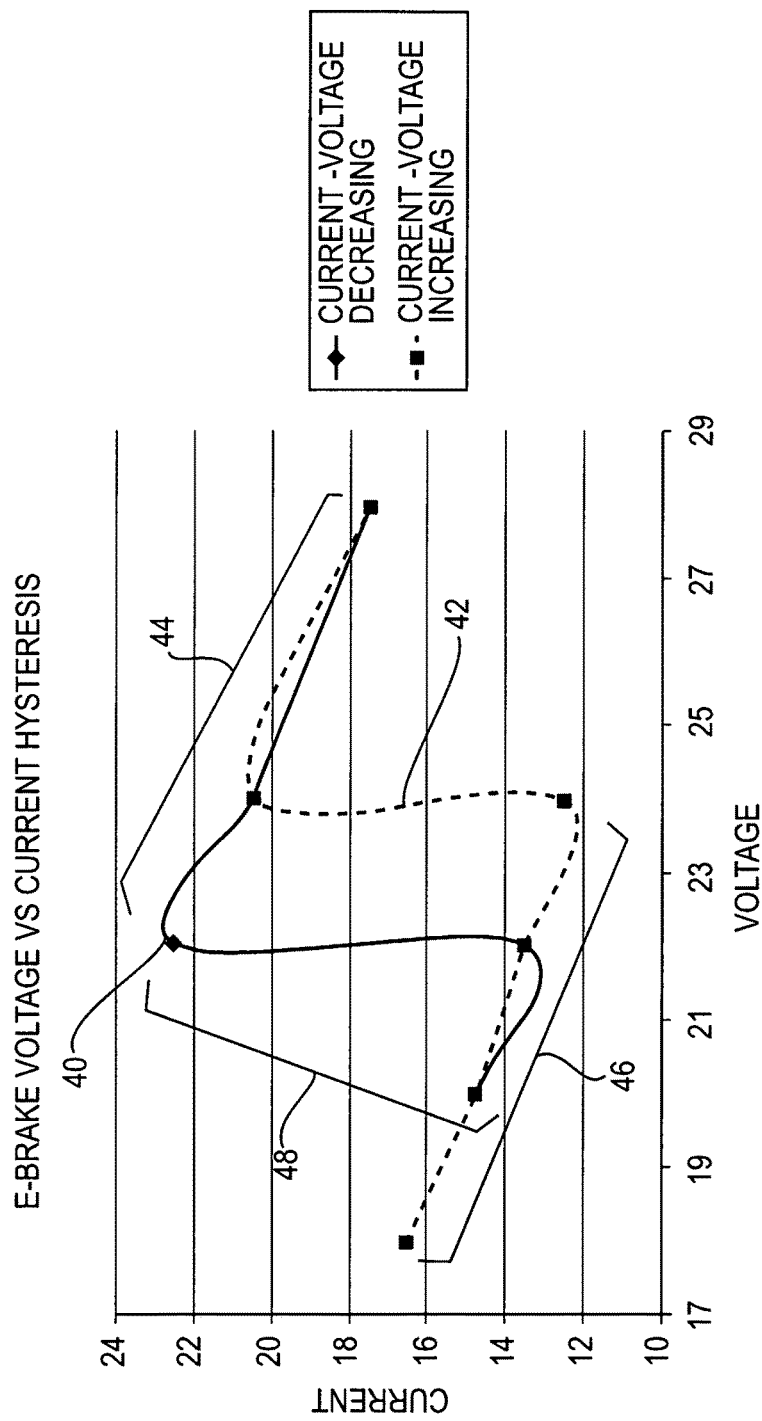
FIG. 3 is a graph plotting current against voltage for the electrical brake system of the present invention.

FIG. 3 provides a graph that plots current versus voltage for the braking system of the present invention. FIG. 3 also illustrates the manner in which the brake controller 32 operates.

In connection with the controller 32, it is noted that the controller 32 may be implemented as software, hardware, or a combination of the two. The controller 32 may be a stand-alone device including a processor. Alternatively, the controller 32 may be a part of another component on the aircraft 10 on which (or by which) the control logic is executed based on the input voltage V.

As illustrated, FIG. 3 includes two graphs. The left hand graph 40 plots current versus voltage when the voltage is decreasing. The right hand curve 42 plots the relationship between the current and the voltage when the voltage is increasing. In either instance, the graphs illustrate the operation of the braking system 28 of the present invention as a function of the voltage V of the power system on board the aircraft 10.

It is noted that the present invention is intended to provide full aircraft braking capability regardless of the point of operation along either curve. To accomplish this objective, both curves 40, 42 define three separate behavioral zones 44, 46, 48, which are designated generally by the brackets in FIG. 3.

The first behavioral zone 44 is at the top of the curves 40, 42. The second behavioral zone 46 is at the bottoms of the curves 40, 42. The third behavioral zone 48 lies in the transition between the first and second behavioral zones 44, 46.

The first behavioral zone 44 illustrates the substantially linear relationship between current I and voltage V for the braking system 28. In this first zone 44, the braking system 28 operates at the highest braking capacity. As a result, in this first behavioral zone 44, the braking system 28 operates at the fastest braking speed.

The second behavioral zone 46 illustrates the substantially linear relationship between the current I and voltage V for the braking system 28. In this second behavioral zone 46, the braking system 28 operates at the lowest permissible braking capacity while ensuring full braking power to stop the aircraft 10. As a result, in this second behavioral zone 46, the braking system 28 operates at the lowest permissible (or acceptable) braking speed.

It is noted that, for both behavioral zones 44, 46, the braking system 28 has full capacity to stop the aircraft 10. However, in the second behavioral zone 46, the aircraft 10 will require a longer distance to come to a full stop, because the power applied to the brakes 36 is less than in the first behavioral zone 44. Another way to think about the curves 40, 42 is that the first behavioral zone 44 illustrates the operation of the braking system at 100% while the second behavioral zone 46 illustrates the operation of the braking system at 80% capacity.

As noted above, the braking system 28 is designed to provide a constant power P to the brakes 36 for each of the behavioral zones 44, 46. In the third behavioral zone 48, the power varies between the first behavioral zone 44 and the second behavioral zone 46, depending on the relationship selected in this transition region.

The third operational zone 48 defines the relationship between current I and voltage V in the transition between the first behavioral zone 44 and the second behavioral zone 46. For the illustrated embodiment, the transition is substantially immediate. In other words, for the illustrated embodiment, a trigger voltage V has been selected. When the power P in the aircraft 10 reaches the trigger voltage V, the braking system transitions from the first behavioral zone 44 to the second behavioral zone 46. With specific reference to the curve 40 illustrated in FIG. 3, at approximately 22 V, the braking system 28 transitions between the first behavioral zone 44 and the second behavioral zone 46.

While a substantially instantaneous transition is illustrated for the third behavioral zone 48 in FIG. 3 for both curves 40, 43, this transition is not required to practice the present invention. It is contemplated that the transition may be linear over a range of voltages V. The present invention is contemplated to encompass an immediate transition or a gradual one.

It is noted that the curves 40, 42 follow the same basic principles of operation. The difference lies in the fact that the curves 40, 42 operate at different currents I and voltages V depending upon the behavior of the voltage V. As noted above, if the voltage V is decreasing, the left hand curve 40 defines the behavior of the braking system 28 of the present invention. If the voltage V is increasing, the right-hand curve 42 defines the relationship between the current I and voltage V for the braking system 28 of the present invention.

As should be apparent to those skilled in the art, these curves define an example of behavioral hysteresis for the current employed in braking system 28 of the present invention.

As is apparent from FIG. 3, in the first behavioral zone 44, the braking system 28 operates according to a substantially linear relationship with a negative slope. In the second behavioral zone 46, the braking system 28 exhibits a substantially linear relationship also with a negative slope. The second behavioral zone 46 is defined by a current I and/or voltage V less than that associated with the first behavioral zone 44. Since the third behaviorally zone 48 has a sudden transition between the first behavioral zone 44 and the second behavioral zone 46, the slope of the transition is essentially infinite (i.e., a vertical line). As noted, the relationship in the third behavioral zone 48 may be linear, with a positive slope, or with a negative slope, without departing from the scope of the present invention.

Figure 4:
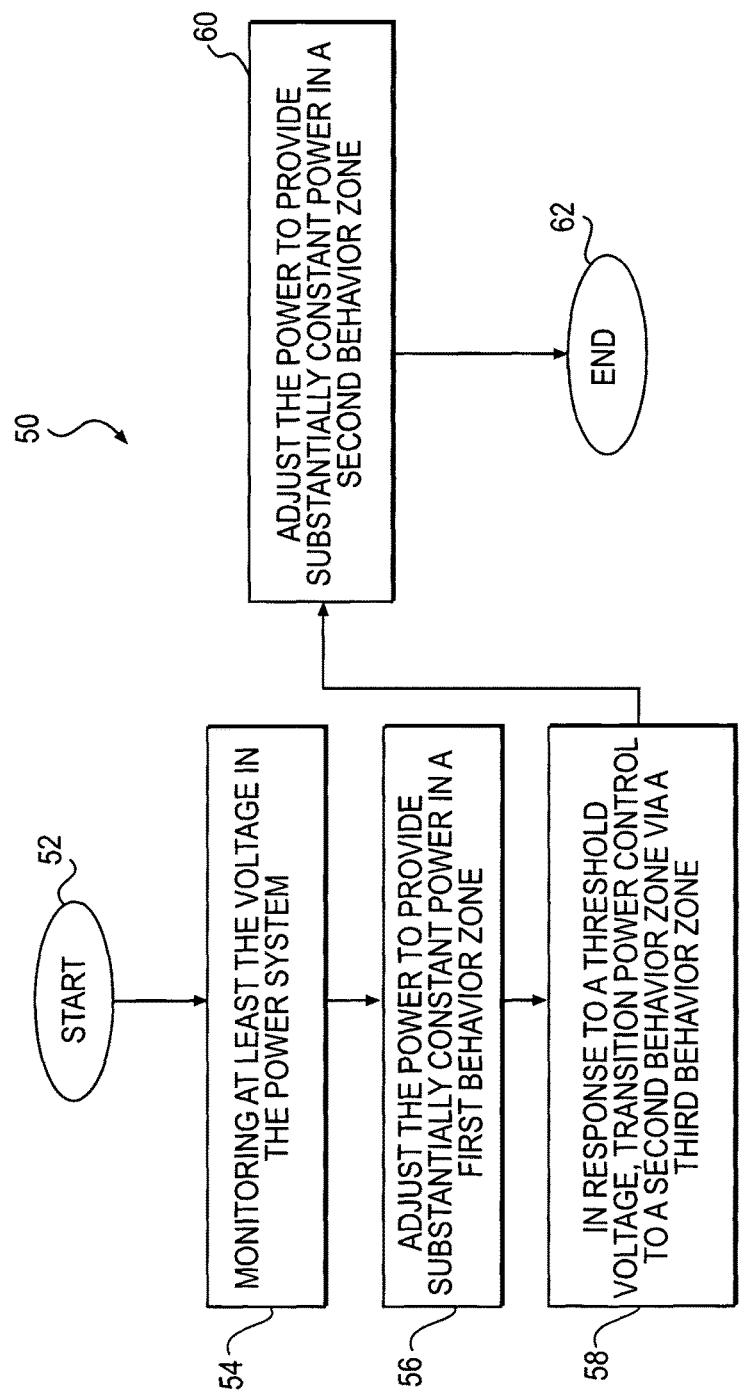
FIG. 4 is a flow chart illustrating one contemplated method of operation of a braking system according to the present invention.

FIG. 4 provides a flow chart that illustrates one contemplated method 50 according to the present invention.

The method 50 starts at step 52.

The method proceeds to step 54, where the voltage V is measured, by the voltage sensor 30, in the power system on board the aircraft 10.

At step 56, the controller 32 adjusts the power P provided to the brakes 36 so that a substantially constant power P is provided to the brakes 36. In this step, the controller 32 controls the current I according to the first behavioral zone 44.

At step 58, the controller 32 transitions power control to follow the plot associated with the second behavioral zone 46. The controller 32 makes this transition in response to receipt of a predetermined threshold voltage V. The transition from the plot associated with the first behavioral zone 44 to the second behavioral zone 46 follows the predetermined logic consistent with the third behavioral zone 48. In the third behavioral zone 48, the controller 32 adjusts the power provided to the brakes 36 according to the predetermined relationship selected for that operational zone.

At step 60, the controller 32 adjusts the power P provided to the brakes 36 so that a substantially constant power P is provided to the brakes 36. In this step, the controller 32 controls the current I according to the second behavioral zone 46.

The method ends at step 62.

As should be apparent from the foregoing, the method 50 is iterative and is adjusted at predetermined time intervals. In particular, steps 54 and 56 define the basic operation of the method 50 of the present invention.

While the relationships between the current I and the voltage V are illustrated as being substantially linear, it noted that the relationship need not be linear to practice the present invention. It is contemplated that the relationships may present a curvilinear plot without departing from the scope of the present invention.

As noted above, the embodiment(s) described herein are intended to be exemplary of the wide breadth of the present invention. Variations and equivalents of the described embodiment(s) are intended to be encompassed by the present invention, as if described herein.

What is claimed is:

1. A method of operating electric brakes for a vehicle, comprising:
    monitoring at least a voltage of a power system of the vehicle; and
    adjusting a power provided from the power system to the electric brakes based on at least the monitored voltage to provide a substantially constant first power to the electric brakes over a range of voltages of the power system within a first behavioral zone.

2. The method of claim 1, wherein the vehicle is an aircraft.

3. The method of claim 1, wherein:
    when the voltage is decreasing over time,
    a first current is selected as a function of a first voltage according to the first behavioral zone, wherein the first current and the first voltage exhibit a substantially linear first relationship with a negative slope,
    a second current is selected as a function of a second voltage according to a second behavioral zone, wherein the second current and the second voltage exhibit a substantially linear second relationship with a negative slope and wherein the first current is greater than the second current, and
    a third current is selected as a function of a third voltage according to a third behavioral zone, wherein the third current and the third voltage exhibit a third linear relationship therebetween.

4. The method of claim 3, wherein the third linear relationship exhibits at least one of a substantially positive slope, a substantially infinite slope, and a substantially negative slope.

5. The method of claim 3, wherein the first voltage is between about 22 to 28 V.

6. The method of claim 1, wherein:
    when the voltage is increasing over time,
    a first current is selected as a function of a first voltage according to the first behavioral zone, wherein the first current and the first voltage exhibit a substantially linear first relationship with a negative slope,
    a second current is selected as a function of a second voltage according to a second behavioral zone, wherein the second current and the second voltage exhibit a substantially linear second relationship with a negative slope and wherein the first current is greater than the second current, and
    a third current is selected as a function of a third voltage according to a third behavioral zone, wherein the third current and the third voltage exhibit a third linear relationship therebetween.

7. The method of claim 6, wherein the first voltage is between about 24 to 28 V.

8. The method of claim 1, further comprising:
    adjusting the power provided from the power system to the electric brakes based on at least the monitored voltage to provide a substantially constant second power to the electric brakes over a range of voltages of the power system within a second behavioral zone, the substantially constant second power being lower than the substantially constant first power.

9. The method of claim 8, comprising transitioning from the first behavioral zone to the second behavioral zone when the voltage of the power system reaches a trigger voltage.

10. The method of claim 8, wherein the substantially constant second power is no less than 80% of the substantially constant first power.

11. The method of claim 8, further comprising:
    varying the power provided from the power system to the electric brakes between the substantially constant first power and the substantially constant second power over a range of voltages of the power system within a third behavioral zone.

12. The method of claim 8, wherein the range of voltages of the power system within the first behavioral zone when the voltage is increasing is different from the range of voltages of the power system within the first behavioral zone when the voltage is decreasing.

13. A controller for operating electric brakes for a vehicle according to an executable set of instructions, wherein the controller:
    receives at least a voltage of a power system of the vehicle; and
    adjusts a power provided from the power system to the electric brakes based on at least the monitored voltage to provide substantially constant power to the electric brakes over a range of voltages of the power system within a first behavioral zone.

14. The controller of claim 13, wherein the vehicle is an aircraft.

15. The controller of claim 13, wherein:
    when the voltage is decreasing over time, a first current is selected as a function of a first voltage according to the first behavioral zone, wherein the first current and the first voltage exhibit a substantially linear first relationship with a negative slope, a second current is selected as a function of a second voltage according to a second behavioral zone, wherein the second current and the second voltage exhibit a substantially linear second relationship with a negative slope and wherein the first current is greater than the second current, and a third current is selected as a function of a third voltage according to a third behavioral zone, wherein the third current and the third voltage exhibit a third linear relationship therebetween.

16. The controller of claim 15, wherein the third linear relationship exhibits at least one of a substantially positive slope, a substantially infinite slope, and a substantially negative slope.

17. The controller of claim 15, wherein the first voltage is between about 22 to 28 V.

18. The controller of claim 13, wherein:
when the voltage is increasing over time,
a first current is selected as a function of a first voltage according to the first behavioral zone, wherein the first current and the first voltage exhibit a substantially linear first relationship with a negative slope, a second current is selected as a function of a second voltage according to a second behavioral zone, wherein the second current and the second voltage exhibit a substantially linear second relationship with a negative slope and wherein the first current is greater than the second current, and a third current is selected as a function of a third voltage according to a third behavioral zone, wherein the third current and the third voltage exhibit a third linear relationship therebetween.

19. The controller of claim 18, wherein the first voltage is between about 24 to 28 V.

20. An executable set of instructions, executable on a controller for operating electric brakes for a vehicle, the executable set of instructions executing a method comprising:
receiving at least a voltage of a power system of the vehicle; and
adjusting a power provided from the power system to the electric brakes based on at least the monitored voltage to provide substantially constant power to the electric brakes over a range of voltages of the power system within a first behavioral zone.

* * * * *